US009042336B2

(12) United States Patent
Nordström et al.

(10) Patent No.: US 9,042,336 B2
(45) Date of Patent: May 26, 2015

(54) SIGNALING OF PRECODING VECTOR PATTERN IN A LEAN-CARRIER SYSTEM

(75) Inventors: Fredrik Nordström, Lund (SE); Bengt Lindoff, Bjärred (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 148 days.

(21) Appl. No.: 13/527,224

(22) Filed: Jun. 19, 2012

(65) Prior Publication Data

US 2013/0336280 A1    Dec. 19, 2013

(51) Int. Cl.
*H04W 72/04*    (2009.01)
*H04L 5/00*    (2006.01)

(52) U.S. Cl.
CPC ......... *H04W 72/0446* (2013.01); *H04L 5/0023* (2013.01)

(58) Field of Classification Search
CPC ............... H04L 5/0023; H04L 5/0048; H04L 2025/03426; H04L 5/0057; H04B 7/0452; H04B 7/0632; H04B 7/0413
USPC .......................... 370/329, 330, 252, 328, 208
See application file for complete search history.

(56) References Cited

U.S. PATENT DOCUMENTS

| 2011/0141927 | A1  | 6/2011 | Luo et al.      |         |
|--------------|-----|--------|-----------------|---------|
| 2011/0149765 | A1* | 6/2011 | Gorokhov et al. | 370/252 |
| 2011/0177788 | A1  | 7/2011 | Nakayama        |         |
| 2012/0028628 | A1* | 2/2012 | Frenger et al.  | 455/422.1 |
| 2012/0218960 | A1* | 8/2012 | Kim et al.      | 370/329 |
| 2013/0034070 | A1* | 2/2013 | Seo et al.      | 370/329 |
| 2013/0044610 | A1  | 2/2013 | Zhao            |         |
| 2014/0038619 | A1* | 2/2014 | Moulsley        | 455/446 |

FOREIGN PATENT DOCUMENTS

| CA | 2803043 A1     | 12/2011 |
|----|----------------|---------|
| CN | 102833192 A    | 12/2012 |
| WO | 2011115421 A2  | 9/2011  |

OTHER PUBLICATIONS

Unknown, Author. "Distributed transmission for ePDCCH." Huawei, HiSilicon. 3GPP TSG RAN WG1 Meeting #68. R1-120046. Dresden, Germany. Feb. 6-10, 2012. 1-4.

(Continued)

*Primary Examiner* — Charles C Jiang
*Assistant Examiner* — Will Lin
(74) *Attorney, Agent, or Firm* — Murphy, Bilak & Homiller, PLLC (57) ABSTRACT

In a system using spatial precoding, in the event that reliable channel state information is unavailable, a transmitting node uses an extended transmission mode, in which the precoders applied to data within each of several groups of time-frequency resources vary according to frequency. The extended transmission mode creates a frequency-selective variation in precoders, which may appear to be random, while using DMRS-based transmission. This variation is achieved by applying different precoders to the resource elements carrying data, using a pattern of precoder variation that is known to the receiving device. The precoding applied to DMRS within a given group of time-frequency resources is held constant—thus, the varying precoders within a given group of time-frequency resources are only applied to data elements, not to the DMRS resource elements.

39 Claims, 5 Drawing Sheets

(56) References Cited

OTHER PUBLICATIONS

3rd Generation Partnership Project. 3GPP TS 36.211 V10.4.0 (Dec. 2011) Technical Specification Group Radio Access Network; Evolved Universal Terrestrial Radio Access (E-UTRA); Physical Channels and Modulation (Release 10). Dec. 2011.

3rd Generation Partnership Project. 3GPP TS 36.213 V10.5.0 (Mar. 2012) Technical Specification Group Radio Access Network; Evolved Universal Terrestrial Radio Access (E-UTRA); Physical layer procedures (Release 10). Mar. 2012.

3rd Generation Partnership Project. 3GPP TS 36.331 V10.5.0 (Mar. 2012) Technical Specification Group Radio Access Network; Evolved Universal Terrestrial Radio Access (E-UTRA); Radio Resource Control (RRC); Protocol specification (Release 10). Mar. 2012.

* cited by examiner

SIGNALING OF PRECODING VECTOR PATTERN IN A LEAN-CARRIER SYSTEM

BACKGROUND

The present invention generally relates to wireless communications systems, and more particularly relates to techniques for spatial precoding of signals transmitted from multiple antennas.

In several wireless communication systems, wireless receivers use one or more of several types of pilot signals to aid in demodulating the received signals. These pilot signals are commonly referred to as reference signals and/or reference symbols. In the $3^{rd}$-Generation Partnership Project (3GPP) specifications for the Long-Term Evolution (LTE) wireless system (also commonly referred to as the evolved UMTS Terrestrial Radio Access Network, or E-UTRAN), a receiving wireless device has two different pilot signal types to use for the data demodulation, common reference signals (CRS) and demodulation reference signals (DMRS). Details of these signals can be found in the 3GPP specifications, e.g., in "Evolved Universal Terrestrial Radio Access (E-UTRA); Physical channels and modulation," 3GPP TS 36.211, v. 10.4.0, December 2011 (available at www.3gpp.org).

CRS are pilots shared by all users, and are used for control channel (PDCCH) and data channel (PDSCH) demodulation as well as for signal measurements made for mobility decisions. DMRS, however, are intended for use by a single user, and thus directly correspond to data targeted to that particular user. DMRS was introduced in Release 9 of the LTE specifications; details can be found, e.g., in 3GPP TS 36.211 and 3GPP TS 36.213, which are available at www.3gpp.org.

The use of DMRS and multi-antenna transmission schemes make it possible for a sending network node to beam-form (pre-code) the transmitted pilot signals as well as the corresponding data signals, based on radio channel characteristics for the link between the transmitting node antennas and the receiver, so that optimized performance is achieved for that particular user. Precoding on the transmitter side is used to support spatial multiplexing and allows multiple signal streams to be transmitted simultaneously. This is achieved by applying a precoding matrix from a set of defined complex weighting matrices to the signal for combining data streams and mapping the combined data streams to multiple antennas for transmission.

The LTE standards continue to develop and are evolving more and more to the use of DMRS instead of CRS for estimating channel characteristics for demodulation purposes. Two main reasons for favoring DMRS over CRS are system performance improvements and coverage gains, which arise due to the possibility to dynamically optimize per-terminal performance based on the current radio channel characteristics.

Another reason for relying on demodulation pilots alone is that this approach raises the possibility that CRS can be removed completely from transmitted signals in a future release of the specifications. In systems operating according to Release 8 of the LTE specifications, CRS must be transmitted in every downlink subframe (see 3GPP TS36.211), regardless of whether or not there is any downlink data transmission in the subframe. One of the reasons for this "always-on" approach to CRS transmission is the need for idle mode terminals to be able to measure signal strength for cell selection. In releases up to at least Release 10 of the 3GPP standards, the wireless device or mobile terminal (user equipment, or UE, in 3GPP terminology) is able to choose which particular CRS to use for this purpose. As a result, the transmitting node (e.g., an evolved Node B, or eNB, in 3GPP terminology) does not know when mobile terminals are making mobility measurements, particularly if those mobile terminals are idle, and therefore cannot turn off CRS even if no actual downlink data transmission is ongoing.

Figure 1:
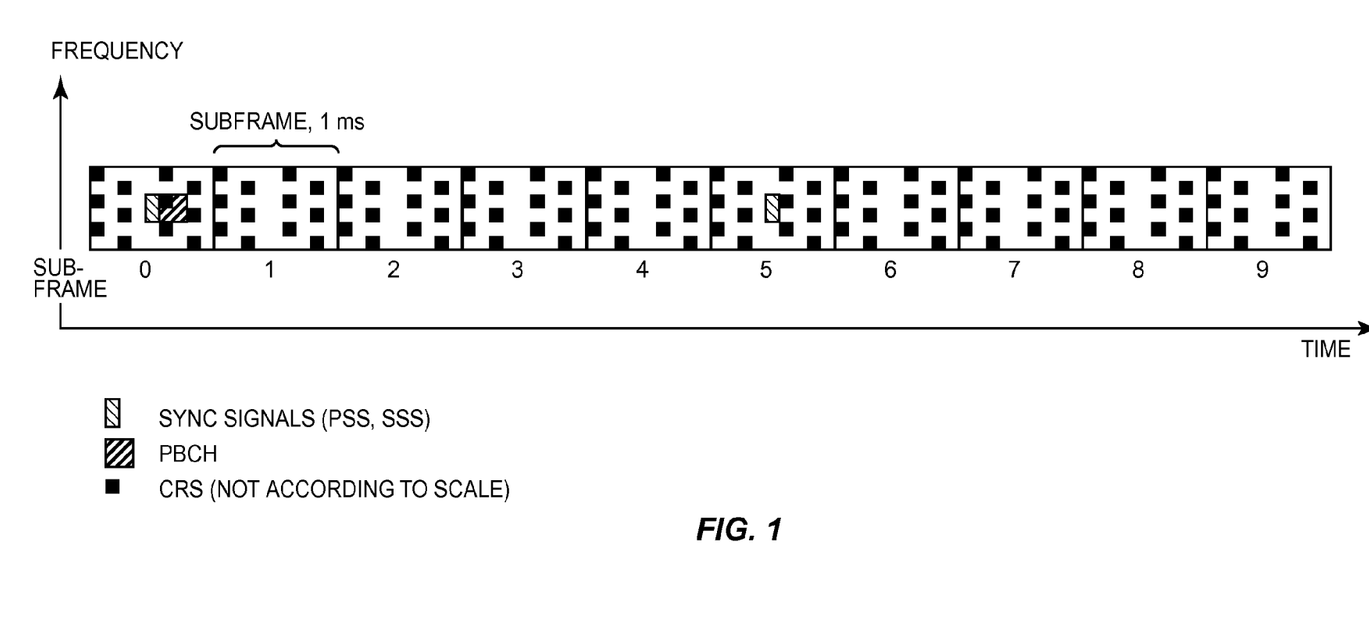
FIG. 1 illustrates the structure of a downlink frame in LTE, including the placement of synchronization signals and common reference signals.

FIG. 1 illustrates an LTE frame, including all of the signals that need to be transmitted from the network node regardless of load in the system, assuming LTE 3GPP Release 8. These signals include the Primary Sync Signal (PSS) and Secondary Sync Signal (SSS), which are found in subframes 0 and 5 of each LTE subframe, the Primary Broadcast Channel (PBCH), in subframe 0, and CRS, which are found at defined resource elements in all subframes.

As seen in the figure, the LTE frame includes 10 subframes. Each subframe consists of 14 Orthogonal Frequency Division Multiplexing (OFDM) symbols (12 when the long cyclic prefix is used), where the symbols are numbered from 0 to 13 (0 to 11 when a long cyclic prefix is used). CRS symbols, which are shown in the figure as solid black rectangles, are transmitted in OFDM symbols 0, 4, 7 and 11, on every sixth subcarrier. The SSS and PSS is transmitted in OFDM symbols 6 and 7, respectively, of subframes 0 and 5 of each LTE frame, in the central six resource blocks with respect to the system's frequency usage. The PBCH is also transmitted in several OFDM symbols in sub frame 0, again in the six central RBs.

One motivation for removing the requirement for "always-on" CRS transmission is that the base station/network node transmitter can be put into sleep mode in several, or even a majority, of the sub frames. This would allow the system to conserve energy in low-load scenarios. However, idle mode terminals need some known sync signals and CRS to rely on for synchronization to the network. This synchronization is needed for the mobile terminals to detect paging, and is also necessary for the mobile terminals to determine the proper timing for a random access transmission to a base station. However, the transmission of signals for these purposes could be done less frequently, in certain well-defined time/frequency positions that could be configured by the network node once a wireless device or mobile terminal registers with the network. Accordingly, in the discussions for the Release 11 (and onwards) for LTE, it has been proposed to only require transmitting network nodes to transmit CRS and other known data (sync symbols and broadcast messages) in a subset of the sub frames. Of course, the Primary Sync Signal and Secondary Sync Signal still need to be transmitted, for the wireless terminal to be able to do cell search and detect the cell. Since broadcast messages as well as paging signals are transmitted in sub frame 0 and 5, and since these data channels need some kind of reference signal for demodulation, there is a need to transmit sync signals and possible CRS at least in these sub frames. At a minimum, then, symbols that must be transmitted from a network node (assuming no load) are the synchronization signals and broadcast information, and possibly also some CRS in sub frames 0 and 5 for demodulation of broadcast and paging messages.

Figure 2:
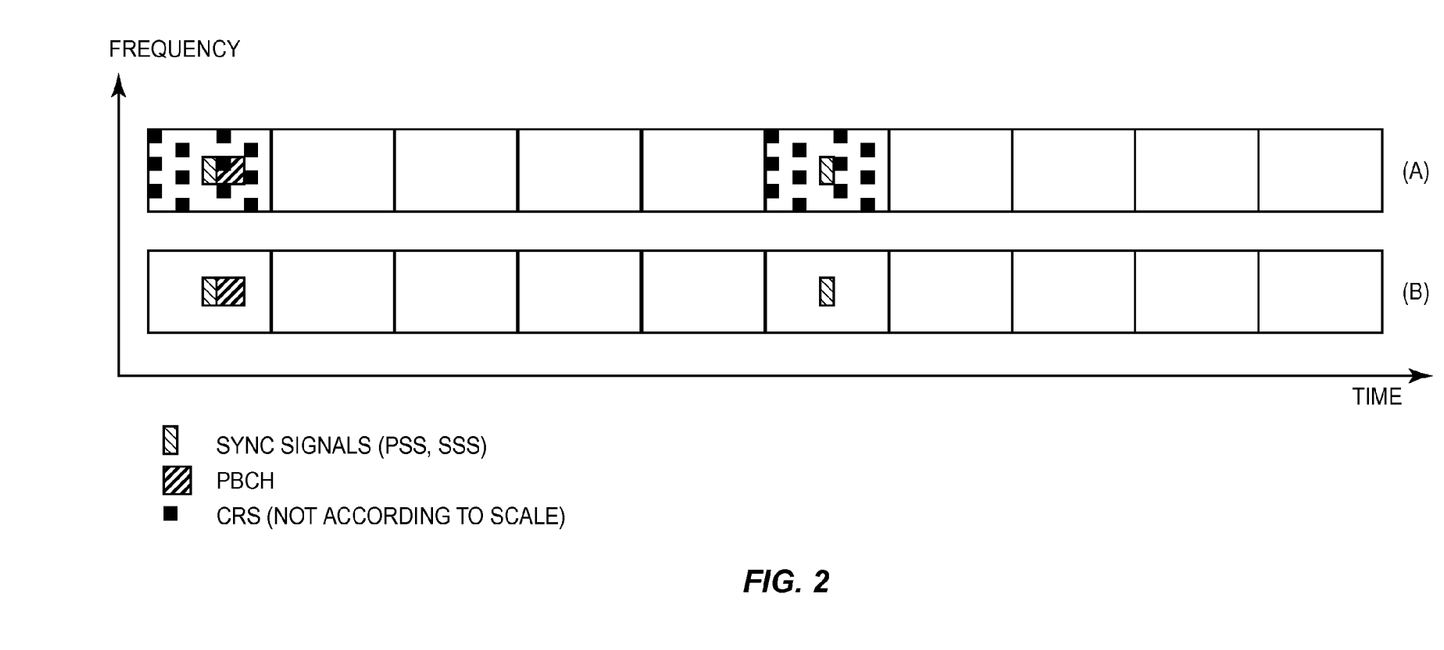
FIG. 2 illustrates two possible structures for a "lean carrier" downlink frame in LTE.

Hence, the removal of CRS gives the network (NW) node the ability to go into sleep mode in some or even a majority of the sub frames, in the event of no load or very low load. The resulting signal after this removal of CRS is called a "lean carrier" in the 3GPP standardization efforts. FIG. 2 illustrates two proposals for such lean-carrier solutions. The top of the figure, labeled "A," represents a first proposed lean carrier structure. With this proposal, CRS are transmitted only in subframes 0 and 5, along with PBCH (subframe 0) and the sync signals PSS and SSS. The lower portion of the figure illustrates a second proposal for the lean carrier's structure, labeled "B," in which no CRS at all are transmitted. In the latter case, PBCH detection at the terminal might rely on the PSS and SSS symbols. It will be appreciated that FIG. 2 illustrates two of the most extreme possibilities for a lean carrier. Lean carriers with CRS in one or more additional subframes are also possible, as are lean carrier structures in which CRS appear in only a subset of resource blocks in one or more subframes of each frame, or lean carrier structures in which CRS appear in a subset of subframes in a subset of frames. Lean carrier structures based on a combination of these features are also possible.

When a lean carrier is used, the transmitting network node need not transmit anything at all in some subframes (e.g., subframes other than 0 and 5), except when there is data to transmit. As discussed above, DMRS are preferably used when transmitting data, to optimize performance. However, in order to determine optimal pre-coding vectors (i.e., antenna-mapping weights used to apply phase and amplitude corrections to data and pilots at each of two or more antennas in a multi-antenna transmission mode) for optimized beam-forming, the transmitting node needs to have knowledge of the propagation channel between the transmitting node antennas and the targeted mobile terminal. This is generally solved by letting the mobile terminal report channel state information (CSI), although other techniques for the network to learn the characteristics of the downlink channel are possible. In LTE, CSI is reported by the mobile terminal in the form of a precoder recommendation, which is based on channel measurements made by the mobile terminal. This precoder recommendation, which includes a Precoder Matrix Indicator (PMI), is based on channel measurements made by the mobile terminal and is used by the transmitting network node to determine the best pre-coding vector for transmitting data to the mobile terminal. CSI reporting might also be based on other formats, such as signaling that indicates a measured signal-to-noise ratio (SNR) or signal-to-noise-plus-interference ratio (SINR), channel rank information, etc. Thus, while the term CSI may sometimes be used herein to refer to LTE-specific reporting of channel state information, it should be understood more generally to refer to any data that characterizes, directly or indirectly, the propagation channel from the network node's transmitting antennas to a mobile terminal.

The effective use of beam-forming relies on good knowledge of the channel characteristics to select the optimal precoder for the downlink transmissions to the mobile terminal. However, good knowledge of the propagation channel can be difficult to obtain in high speed scenarios, due to rapid changes in the channel's characteristics. There is always a delay inherent in the CSI reporting to the network node (e.g., 3-10 milliseconds), and in the event of rapid channel changes, such as might occur when the mobile terminal is moving rapidly, the CSI information might be outdated by the time it is applied to the data. Accurate knowledge of the propagation channel may be unavailable in other circumstances as well, such as when a mobile terminal first goes into active mode and does not have accurate channel estimates, or when the SNR at the mobile terminal is very low, or when the mobile terminal is not configured to send precoding information to the base station. The wrong pre-coder can thus be applied in any of these circumstances, e.g., a precoder optimized not to the present radio channel, but the radio channel as it was several milliseconds earlier. Applying a precoder based on outdated CSI might actually make the receiving conditions worse, such that there is destructive interference between the radio signals from the multiple antennas as opposed to the constructive combining that is desired.

Under Release 10 of the LTE specifications, this problem can be solved by switching from a DMRS-based transmission method to CRS-based beam forming methods. This switching is accomplished through the use of Radio Resource Control (RRC) signaling sent to the mobile terminal to indicate which transmission mode to use, CRS-based or DMRS based. Details may be found in 3GPP TS 36.331, available at www.3gpp.org. Alternatively, the system may automatically fall back to a transmit diversity (TxDiv) scheme if the terminal is configured with no precoder feedback. CRS-based channel estimation is then used by the mobile terminal for demodulating data, which is transmitted to the mobile terminal using the TxDiv or large Cyclic Delay Diversity (CDD) approaches, which are both well-known in the art and described in 3GPP TS 36.211 and 3GPP TS 36.213.

However, these approaches to handling unreliable channel state information cannot be used effectively with a lean carrier, since no CRS is present in a majority of the downlink subframes. One possible solution to this problem is to simply turn on all CRS in a cell if it becomes known that the channel state information for a single mobile terminal is unreliable or unavailable. Clearly it will not be energy efficient to turn on the CRS to solve occasional problems with unreliable or non-existent precoder information for a single mobile terminal. Further, a solution based on turning on and off the CRS would require signaling to all UEs in the cell, to notify them of this CRS reconfiguration.

Hence, there is a need for improved techniques for managing DMRS-based and CRS-based transmissions in the event that reliable precoder information is unavailable, especially when techniques like lean carrier are used.

SUMMARY

In a system using spatial precoding, in the event that reliable channel state information is not available, a transmitting node according to some embodiments of the invention uses an extended transmission mode, in which the precoders applied to data within each of several groups of time-frequency resources vary according to frequency. This extended transmission mode can be a new standardized transmission mode (e.g., "TRM 10" in a future LTE specification) and identified to mobile terminals as such in configuration signaling, in some embodiments.

The extended transmission mode creates a frequency-selective variation in precoders, which may appear to be random, while using DMRS-based transmission. This variation is achieved by applying different precoders to the resource elements carrying data, using a pattern of precoder variation that is known to the receiving device. The precoding applied to DMRS within a given group of time-frequency resources is held constant—thus, the varying precoders within a given group of time-frequency resources are only applied to data elements, not to the DMRS resource elements.

An example method according to some embodiments of the invention is implemented in a first node of a wireless communication system, such as an LTE eNodeB, where the first node is configured to transmit data to a second node. This example method begins with an evaluation of channel state information (CSI) corresponding to the second node, to determine whether the CSI is likely to be unreliable for a given transmission time interval.

In some of these embodiments, the CSI is first received from the second node, e.g., as a Channel Quality Indicator (CQI) report. In other embodiments or in other instances, the CSI is estimated, based on uplink transmissions from the second node.

In some embodiments, the evaluation of the CSI to determine whether it is likely to be unreliable includes evaluating the CSI to determine whether a variability in channel conditions over time exceeds a threshold. In some of these embodiments, the CSI comprises a recommended precoder, and determining that a variability in channel conditions over time exceeds a threshold comprises counting a number of changes in recommended precoder over a time interval and comparing the number of changes to the threshold. In some embodiments, the evaluation of the CSI to determine whether it is likely to be unreliable includes evaluating an age of the received first channel station information relative to the first transmission time interval and determining whether the age exceeds a threshold.

If the transmitting node determines that the CSI for the remote node is likely to be unreliable, the transmitting node switches over to a transmission mode, such as the extended transmission mode described above, in which the precoder applied to data is changed often, e.g., every resource element or group of resource elements. In some cases, a re-configuration procedure is initiated to alert the receiving device of the new transmission mode. This may be done via RRC signaling, for example, but other approaches are possible, including Medium Access Control (MAC) signaling. In some cases, information identifying a pattern or patterns of precoder variations to be used is sent to the receiving device, such as a wireless terminal or user equipment, as well, but in other embodiments the receiving node is pre-configured so that it already knows the patterns that will be applied. These patterns may be predetermined by standards, for example.

More particularly, demodulation reference symbols (DMRS) for each of a plurality of groups of time-frequency resources are precoded, using one or more DMRS precoding vectors. However, the precoding applied to all DMRS within each group of time-frequency resources is constant. Data for each of the groups of time-frequency resources is precoded using the varying precoders discussed earlier, i.e., using multiple data precoding vectors for each group so that the precoding varies according to different frequencies within the group. In several embodiments of the present invention, this variation of the precoders advantageously creates robustness against outdated or incorrect precoder information.

When CSI for the remote node is determined to be reliable, on the other hand, conventional transmission schemes can be used, including, for example, the multi-antenna transmission schemes defined in the LTE specifications as of Release 9 of the 3GPP specifications. With these conventional transmission schemes, the precoding vectors applied to data and demodulation reference symbols are derived from the CSI.

Further details of the above-summarized methods are provided in the following detailed description. Corresponding techniques for receiving and demodulating data transmitted according to the extended transmission modes summarized above are also disclosed. In addition, apparatus configured to carry out one or more of these methods are described. Of course, the present invention is not limited to the above-summarized features and advantages. Indeed, those skilled in the art will recognize additional features and advantages upon reading the following detailed description, and upon viewing the accompanying drawings.

DETAILED DESCRIPTION

The invention is described more fully hereinafter with reference to the accompanying drawings, in which examples of embodiments of the invention are shown. This invention may, however, be embodied in many different forms and should not be construed as limited to the specific embodiments set forth herein. It should also be noted that these embodiments are not mutually exclusive. Thus, components or features from one embodiment may be assumed to be present or used in another embodiment, where such inclusion is suitable.

For purposes of illustration and explanation only, these and other embodiments of the present invention are described herein in the context of operating in a radio access network (RAN) that communicates over radio communication channels with wireless terminals (also referred to as user equipment, or "UEs"). More particularly, specific embodiments are described in the context of systems using Long-Term Evolution (LTE) technology, also known as evolved UMTS Terrestrial Radio Access Network (E-UTRAN), as standardized by the membership of the $3^{rd}$ Generation Partnership Project (3GPP). It will be understood, however, that the present invention is not limited to such embodiments and may be embodied generally in various types of communication networks. As used herein, the terms mobile terminal, wireless terminal, wireless device or UE can refer to any device that receives data from a communication network, and may include, but are not limited to, a mobile telephone ("cellular" telephone), laptop/portable computer, pocket computer, hand-held computer, modem, desktop computer, and/or a machine-to-machine type communication device, such as a sensor.

Also note that the use of terminology such as "base station" (which may be referred to in various contexts as NodeB, for example) and "wireless terminal," "mobile terminal," or "wireless device" (often referred to as "UE" or "User Equipment") should be considering non-limiting and does not necessarily imply a certain hierarchical relation between two particular nodes of a communication link. In general, a base station (e.g., a "NodeB") and a wireless terminal (e.g., a "UE") may be considered as examples of respective different communications devices that communicate with each other over a wireless radio channel.

Likewise, the terms "transmitting node" and "receiving node" may be used herein to distinguish one device from another, with the "transmitting" and "receiving" designations used only to indicate which device is at which end of a particular transmission or transmissions of interest. Again, the use of these terms does not necessarily imply a certain hierarchical relation between two particular nodes of a communication link. It should be appreciated, of course, that a "transmitting node" may often (and may generally) include receiving hardware, just as a "receiving node" may be adapted to transmit signals as well. While embodiments discussed herein may focus on wireless transmissions in a downlink from a base station (an eNodeB, in LTE specifications) to a UE, the inventive techniques may also be applied, for example, to uplink transmissions in some contexts. As a result, several embodiments of the invention described in detail below may be suitable for use in various wireless terminals, base stations, or both. It will be appreciated, of course, that the details of accompanying circuitry, including antennas, antenna interface circuits, radio-frequency circuits, and other control and base band circuits, will vary, depending on the specific application of the inventive techniques disclosed herein. Because these details are not necessary to a complete understanding of the present invention, those details are generally omitted in the following discussion and in the accompanying figures.

As of Release 10 of the LTE specifications, there are nine transmission modes (TRM) defined for downlink transmissions. The device is informed by the network, via Radio Resource Control (RRC) signaling, of which transmission mode to use.

TRM 1 and TRM 2 correspond to transmissions using one and two transmitting node antennas, respectively, with CRS used by the receiving node for demodulation. TRM 3 is an open-loop spatial multiplexing mode that operates the same as TRM 2 if the rank of the channel is one but that uses a large-delay Cyclic-Delay Diversity (CDD) transmission mode otherwise. TRMs 4 and 6 correspond to closed-loop spatial multiplexing—multiple information streams are transmitted in TRM 4, while TRM 6 sends only a single codeword, using a beam-forming pre-coder. TRM 5 is related to multi user-MIMO schemes, where spatially multiplexed information streams are targeted to different users.

TRMs 1-6 are all CRS-based methods, in that the UE receiver uses CRS to measure the propagation channel for demodulation purposes. TRMs 7, 8, and 9, on the other hand, are different versions of DMRS-based transmission schemes. TRM 7 is used for UE-specific beam-forming, but without closed-loop pre-coding feedback from the UE. TRM 8 is a dual-layer transmission mode that may use closed-loop pre-coding feedback. TRM 9 supports both single-user and multi-user MIMO transmission, without the need for the UEs to be reconfigured by higher-layer signaling when switching between single-user and multi-user transmission. Of these DMRS-based modes, TRM 9 is expected to be the most commonly used.

As discussed above, the effective use of multi-antenna transmission schemes depends on the availability of accurate information about the propagation channel between the transmitting node and the targeted receiver, so that the transmitting node can select the optimal precoder for the transmissions. However, accurate information for the propagation channel can be difficult to obtain in several scenarios, including scenarios in which the receiver is moving rapidly.

Under Release 10 of the LTE specifications, this problem can be addressed, at least in part, by switching from a DMRS-based transmission method to CRS-based beam forming methods, i.e., from any one of TRMs 7-9 to one of TRMs 1-6. However, these approaches to handling unreliable channel state information cannot be used effectively with a lean carrier, since no CRS is present in a majority of the downlink subframes. As noted above, turning on CRS transmission in all subframes to accommodate one or a few mobile terminals in a cell is an unattractive solution. As of Release 10 of the LTE specifications, TRM 9 supports a fallback mode to a transmit diversity (TxDiv), when there is precoding information sent in the uplink. This TxDiv transmission is only rank 1 transmission, however.

Instead, with the techniques disclosed below, higher rank transmission may be used even when the channel state feedback from the UE is unreliable, e.g., because the UE is moving so quickly that the feedback is out of date before it can be put to use. These techniques may also be used when lean carriers are in use.

According to several of these techniques, data to be transmitted in each of multiple groups of time-frequency resources is precoded using multiple data precoding vectors for each group, so that the precoding varies according to different frequencies within the group, e.g., according to different subcarriers or groups of subcarriers. However, the precoding of demodulation reference symbols (DMRS) within each group of time-frequency resources is constant. In other words, for a particular group of time-frequency resources, only a single precoder is used for precoding the DMRS in that group. (Different DMRS precoding might be applied to DMRS in other groups.) Within that same group, multiple precoders are used to precode data to be carried by that group.

The precoding vectors applied to data vary across frequencies within each group according to a specific pattern, which may be selected to appear random. Different patterns may be applied to different groups of time-frequency resources. In an LTE system in particular, this varied pattern of precoders can be applied at the resource-block level or, at the level of the Precoding Resource block Group (PRG).

The receiving device uses the DMRS within a group of time-frequency resources, e.g., within a PRG, to demodulate the data carried by those time-frequency resources. To effectively demodulate the data, the receiving device must know the pattern of precoding that is applied to the data, relative to the DMRS precoding for that group. Because the precoding varies across frequency within a group, the precoding will be effective (i.e., a good match to the actual channel conditions) for some time-frequency resources, and less effective for others. However, because the turbo-encoded data bits are interleaved among all of the time-frequency resources allocated to the receiver, "good" bits and "bad" bits are spread randomly throughout the turbo-encoded data, allowing the original data to be successfully recovered in many circumstances. According to the embodiments, the variation of the precoders thus advantageously creates robustness against outdated or incorrect precoder information.

In many systems, including LTE, the receiving device is informed by the transmitting node, e.g., using Radio Resource Control (RRC) signaling, of which transmission mode is in use. In some embodiments of the present invention, the precoding technique described above can represent another transmission mode, the use of which can be signaled to the receiving device using normal signaling techniques. For instance, the techniques described above could be part of a transmission mode 10 (or another number) in an LTE system. An alternative is that the techniques described above are viewed as an extension of an existing transmission mode or modes, such as LTE's TRMs 8 and/or 9. In this case, the use of this extension to the existing mode could be signaled by a new bit in an existing message, or the re-use of a bit in an existing message, or the like, or by a specific bit combination within an existing message, such as a specific bit combination within LTE's current TRM 8 and 9 control signal formats. Still another alternative is that the new mode is connected to certain mobile terminal identifiers, e.g., Radio Network Temporary Identifiers (RNTIs), such as broadcast messages transmitted with System Information (SI)-RNTI, Paging (P)-RNTI, Random Access (RA)-RNTI and Temporary Cellular (TC)-RNTI. Yet another alternative for the new mode is to let the receiving device assume that the given new transmission mode is used under certain conditions, such as for semi-persistent scheduled messages, i.e., when the wireless device is scheduled to receive data in a fixed pattern, for example in a few subframes every 20-100 ms.

The variation of precoders applied to data within a group of time-frequency resources and across multiple groups of time-frequency resources can be done in any of several ways. Approaches that make the variation of precoders appear randomly selected, either from the complete range of available precoders or from a subset, such as a subset of precoders that are generally oriented in a particular spatial direction, may be particularly effective. One way to accomplish this "randomization" of the precoders is to select the DMRS precoder for each group of time-frequency resources randomly, or according to a pseudo-random selection process. The precoders applied to data within each group of time-frequency resources can conform to a pattern, which may be the same for each group or vary across groups. However, this pattern is applied relative to the DMRS precoding vector. Thus, the entire set of data precoders applied to data for a given transmission can appear to be randomly selected.

The precoding of data can be expressed mathematically as follows:

$$r_k = H * T * S_k * d, \quad (1)$$

where d is the encoded data before precoding, $r_k$ is the received data signal, H is the propagation channel response, and T is the DMRS precoder vector. $S_k$ is a matrix of precoding vectors that provides the frequency diversity within a group of time-frequency resources, and varies with frequency, e.g., with respect to subcarriers k. The same $S_k$ can be applied to several adjacent data subcarriers. For the DMRS, $S_k$ is the unity matrix, while for data resource elements $S_k$ is looped over the set of precoding vectors according to the pattern discussed above.

That the technique described herein is an "extended" precoding mode can be understood by appreciating that equation (1) can be used to characterize the precoding applied in LTE's TRM 9 (according to Release 10 of the 3GPP specifications), by assuming that $S_k$ is the unity matrix. Then, the matrix T is the precoding matrix for both DMRS and data, which is constant over several Resource Blocks (RB). The extended transmission mode discussed above introduces the extra matrix $S_k$, which are the known precoding matrixes applied to data elements, to obtain more frequency diversity in the precoding, and which vary according to subcarriers k. Note that in previously used techniques, including in LTE's TRM 9, the precoding matrix must be the same over several resource blocks, and the same precoder is applied to both pilots and data within a resource block or groups of resource blocks. The extended transmission mode of the present invention uses different precoders for different subcarriers, and pilots and data are precoded differently.

One specific example of how the different precoders are chosen is to select precoders from a set of N precoders, where the precoders are indexed from 0 to N-1. The precoder for subcarrier k can be retrieved using the function k modulo N. Alternatively, k could refer to a small group (e.g., 2 or 3) of adjacent subcarriers, so that the precoder does not vary for every subcarrier but instead for each group of subcarriers.

Figure 3:
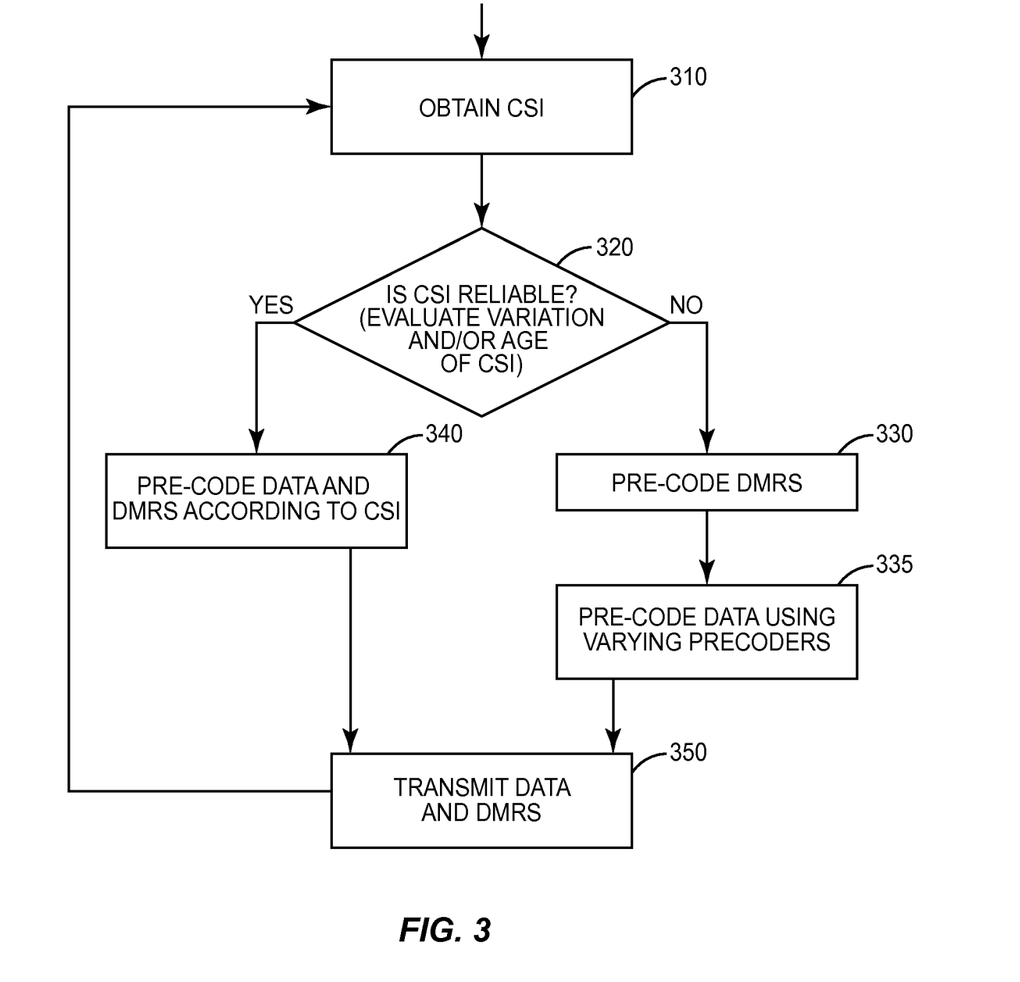
FIG. 3 is a process flow diagram illustrating an example method according to some embodiments of the present invention.

FIG. 3 is a process flow diagram illustrating these techniques according to several embodiments of the present invention. The illustrated process might be applicable, for example, when a UE is in active mode and served by a network node/eNodeB/base station in a wireless network. Although the illustrated technique is more generally applicable, the downlink transmission in this example scenario is based on user-specific reference signals, e.g., using DMRS, and there is no support for common reference signals in downlink. This might be the case, for example, when an LTE lean carrier is in use.

The illustrated process begins, as shown at block 310, with obtaining Channel State Information (CSI) from a wireless device, i.e., a remote node to be targeted by a precoded transmission of data. This CSI may comprise a Channel Quality Indicator (CQI) report from a UE, for example, including a Precoding Matrix Indicator and/or a Rank Indicator (RI). CSI obtained from the remote node may take other forms, however. Further, the CSI obtained from the wireless device may not be an explicit CSI report. In some cases the CSI may be obtained by receiving the CSI from the wireless device/terminal and in other cases by evaluating transmissions from the wireless device and estimating the channel conditions to the wireless device from those transmissions.

In many cases, however, CSI consists of suggested pre-coding vectors/matrices sent by the targeted wireless device/terminal. Under normal circumstances, the base station can obtain or compute precoders from the CSI, often by simply applying the suggested pre-coding vectors to the transmitted data symbols and/or DMRS. Techniques for evaluating the channel conditions and selecting a best precoding vector, e.g., from a codebook of precoders, are well known in the art and are thus are not detailed herein.

Referring again to FIG. 3, the present technique continues, as shown at block 320, with an evaluation of whether the channel state information (CSI) for the remote node is likely to be reliable or unreliable for a given transmission time interval. One way to assess the reliability of the CSI is based on the variation of the received CSI over time. In the case of a slowly varying channel (e.g., corresponding to UE speeds of under 30 km/h) the CSI reported in adjacent subframes are substantially the same or varying very slowly and are thus likely to be reliable. However, in the case of high velocity, the pre-coding vectors will change significantly between adjacent subframes. This implies that they will be outdated once the transmitting node applies the pre-coding vectors to the DMRS and data symbols. They are thus likely to be unreliable. Other examples of when CSI (e.g., precoder recommendations) provided from the remote device are unreliable include: in the case of low signal-to-noise ratio (SNR) at the remote device; at the start-up of a connection or upon the initialization of some transmission modes, such as LTE TRM 9; and when the terminal is configured to not feedback any precoder information (e.g., to limit uplink control signaling).

Based on an evaluation of any or several of the above conditions, the base station (or other transmitting node) thus determines whether the precoders are unreliable. This can be determined from fast changes of the suggested precoder or other CSI received from the remote node, e.g., by evaluating the first channel state information and determining that a variability in channel conditions from one time interval to another (e.g., from one CSI reporting time to another) exceeds a threshold. Similarly, the number of significant precoder changes over a particular amount of time (e.g., 10 milliseconds) may be evaluated, and compared to a threshold. If, for example, more than three large changes have occurred in a 10-millisecond time frame, then the CSI for the present transmission time interval is defined to be unreliable. Of course, other thresholds may be used. Still another approach is to evaluate an age of the channel station information, relative to the transmission time interval of interest, and determining whether the age exceeds a threshold. If so, the CSI are defined to be unreliable, otherwise they are found to be reliable. Any of these approaches can be combined, in various embodiments of the invention.

If it determines that the CSI for the remote node is reliable, the transmitting node responds by precoding data according to the received CSI, i.e., operating according to conventional approaches. This could include, for example, precoding according to TRM 9, in an LTE system. This is shown at block 340 in FIG. 3. The precoded data and demodulation reference symbols are then transmitted to the second node, over multiple transmit antennas, as shown at block 350.

If, on the other hand, the transmitting node determines that the CSI for the remote node is likely to be unreliable, the transmitting node switches over to a transmission mode, such as the extended transmission described above, in which the precoder applied to data is changed often, e.g., every resource block or group of resource blocks and/or every transmission-time interval or group of transmission-time intervals. In some cases, a re-configuration procedure is initiated to alert the receiving device of the new transmission mode. This may be done via RRC signaling, for example, but other approaches are possible, including Medium Access Control (MAC) signaling. In some cases, information identifying a pattern or patterns of precoder variations to be used is sent to the receiving device as well, but in other embodiments the receiving node is pre-configured so that it already knows the patterns that will be applied. These patterns may be predetermined by standards, for example.

As shown at block 330, demodulation reference symbols (DMRS) for each of a plurality of groups of time-frequency resources are precoded, using one or more DMRS precoding vectors. However, the precoding applied to all DMRS within each group of time-frequency resources is constant. As shown at block 335, data for each of the groups of time-frequency resources is precoded using the varying precoders discussed earlier, i.e., using multiple data precoding vectors for each group so that the precoding varies according to different frequencies within the group.

The set from which these varying precoders are taken or derived can be such that the resulting precoding of the data covers all directions in the radio channel space, or so that the precoding only spans one main direction. If a subset of precoders is used, it may be especially important to signal the receiving device to identify the appropriate subset. In LTE, for example, this signaling may be according to the CodeBookSubsetRestriction specified in 3GPP specifications 3GPP TS 36.211 and 3GPP TS 36.213 (available at www.3gpp.org), or the signaling might identify a predefined subset of precoders given by a future standard.

The varying precoders are applied only to the data Resource Elements (RE), and the change of precoder should preferably be made as often as possible in the frequency direction, e.g., every subcarrier, or every resource block, or every set of resource blocks. The reason for varying the precoder over the frequency domain is the same as for varying it over the time domain. The receiving device can estimate the channel from the DMRS, and since the receiving device then knows (either from signaling or from the standard) which precoders the transmitting node has applied to the data resource elements, the receiver can then also apply the same precoders to demodulate the received symbols. Data can then be decoded from the demodulated symbols.

The process illustrated in FIG. 3 may be repeated several or many times. Each time it is repeated, the currently available CSI may be re-evaluated (as shown at block 320) to determine whether it is reliable or not. For a given mobile terminal, the reliability of the corresponding CSI may change from time to time. Thus, variable precoding according to the technique described above may be applied for a first transmission time interval, because reliable CSI is unavailable. At a second transmission time interval, variable precoding may again be used, because the CSI is still unreliable. In this case, the precoding may be variable across time, relative to the earlier precoding, as well as across frequency. Thus, for example, the multiple data precoding vectors applied to the different frequencies of each group during the second transmission time interval may differ from the data precoding vectors applied to those same frequencies in the first transmission interval.

The CSI for a later transmission time interval may be more reliable, in which case the system can use precoders that are derived from the CSI, as shown at block 340 of FIG. 3. The rate at which this re-evaluation occurs can vary from one system to another. Further, in some cases it may be useful to apply a filtering operation and/or a hysteresis function to the reliability determination process, to avoid overly rapid switching between the randomized precoding mode and the conventional approach.

The techniques described above and illustrated in FIG. 3 can be implemented in a transmitting node in a wireless communication system. This transmitting node can be a base station, such as an eNodeB, in some embodiments. The transmitting node need not be a single physical entity, however. In some cases, for example, the radio frequency circuitry for both the receiver and transmitter circuitry may be in a separate physical unit from a controller circuit. This separate physical unit may be a remote radio unit (RRU), for example, in systems where a base station controls one or several radio transceivers that are geographically separated. In other cases, some or all of the control functionality described herein, such as the evaluation of CSI to determine whether the extended precoding mode described above is to be used, may be located in a control unit that is physically separate from a base station, such as in a radio network controller.

According to several embodiments of the present invention, however, the transmitting node includes a transmitting circuit adapted to transmit data and demodulation reference symbols to a second node (such as a wireless device/terminal or an LTE UE) over multiple transmit antennas. The data and DMRS are transmitted in each of a plurality of groups of time-frequency resources during each of one or more transmission time intervals, using a DMRS precoding vector applied to the demodulation reference symbols for each group of time-frequency resources and a varying set of data precoders applied to the data within that group. In an LTE system, for example, these groups of time-frequency resources can be individual Resource Blocks, or groups of Resource Blocks.

The transmitting node further includes a control circuit adapted to determine whether CSI corresponding to the second node is likely to be unreliable for a given transmission time interval and to control the transmitting circuit accordingly. In the event that the control circuit determines that the CSI is not reliable for a particular transmission time interval, the control circuit controls the transmitting circuit to, for each of a plurality of groups of time-frequency groups of time-frequency resources during the transmission time interval, transmit demodulation reference symbols (DMRS) to the second node over multiple transmit antennas, using a DMRS precoding vector, so that the precoding applied to all DMRS within each group of time-frequency resources is constant. The control circuit further controls the transmitting circuit to, for each group of time-frequency resources during the transmission time interval, transmit data to the second node over the multiple transmit antennas, using multiple data precoding vectors that vary according to different frequencies within the group. When the control circuit determines that the CSI is reliable, e.g., for a different transmission time interval, the control circuit controls the transmitting circuit to apply a precoding vector or vectors that are derived from the CSI, e.g., according to TRM 9 as defined in Release 10 of the 3GPP specifications. In this case, the precoding vector applied to all of the data and DMRS within a given group of time-frequency resources is the same.

Figure 4:
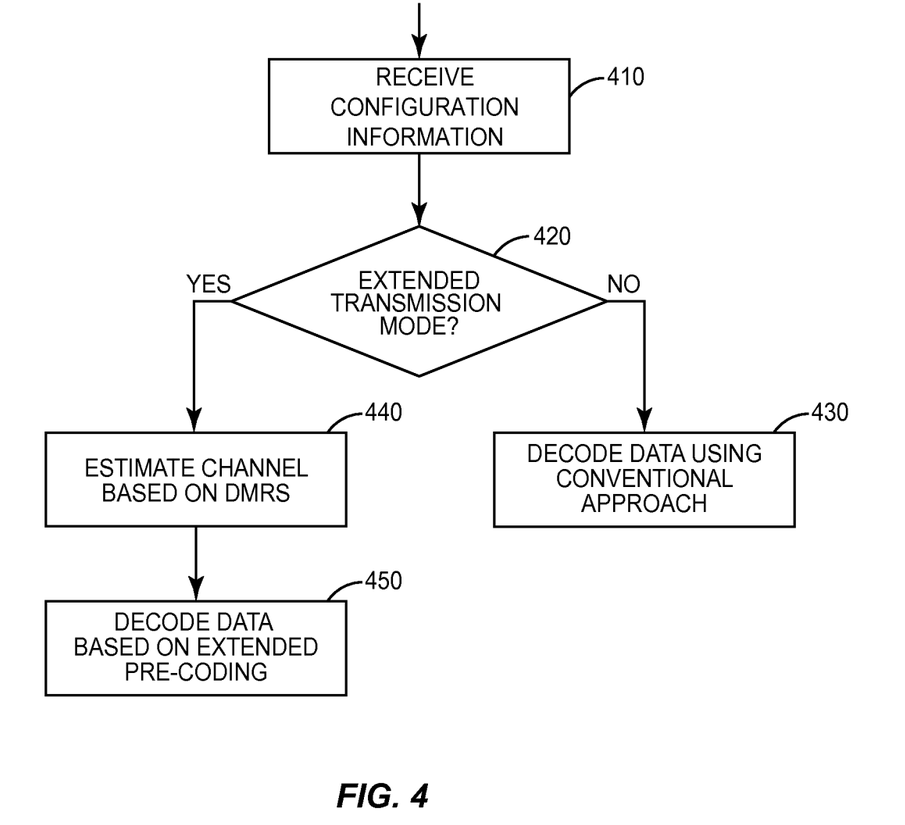
FIG. 4 is a process flow diagram illustrating another example method according to some embodiments of the present invention.

FIG. 4 illustrates an example method for handling the extended transmission mode described above, at the receiving node. This method may be implemented in an LTE UE, for example.

As shown at block 410, the method begins with the receiving of configuration information from the network, the configuration information identifying a transmission mode. In some embodiments, the extended transmission mode may correspond to a distinct mode from previously implemented modes, and may be identified as such. In other cases, the extended transmission mode described herein may be regarded as an extension of an existing mode or modes, in which case the use of the extended transmission mode may be explicitly signaled by one or more bits that indicate that the extended transmission mode is applicable. In still other embodiments, the receiving device may be configured to assume that the extended transmission mode is applicable in certain circumstances. In this latter case, a signaling step to explicitly indicate the extended transmission mode may be omitted entirely.

Thus, as shown at block 420, the example method of FIG. 4 continues with a determination of whether data received in a first transmission time interval is transmitted according to an extended transmission mode in which data within each of a plurality of groups of time-frequency resources is precoded for multi-antenna transmission according to different frequencies within the group. As suggested immediately above, this determination may be based on explicit signaling or on an evaluation of the current operating conditions with respect to pre-programmed assumptions as to when the extended transmission mode is applicable.

If the extended transmission mode is not applicable, data for the receiving device is demodulated and decoded according to the conventional approach, as shown at block 430. This may be according to one of the existing transmission modes (TRMs 1-9) in an LTE system, for example.

If the extended transmission mode is applicable, however, a different approach is taken, as shown at blocks 440 and 450. First, as shown at block 440, the receiving device estimates a propagation channel response for each group of time-frequency resources, using DMRS received within the group, based on an assumption that precoding of DMRS within the group is constant. Then, as shown at block 450, the receiving device demodulates data received within each group of time-frequency resources, wherein the demodulating is based on a pattern of data precoding vectors for the group that vary according to different frequencies within the group. As noted above, the pattern applied to each group may be a pre-programmed pattern, such as according to an agreed standard, or a pattern identified by signaling from the transmitting node.

In some cases, such as in an LTE-based system, each group of time-frequency resources comprises a plurality of sub-carrier frequencies. In these systems, the data precoding vectors applied to data carried by the time-frequency resources are different for each sub-carrier frequency of the group, in some embodiments. In other embodiments, the data precoding vectors applied to data carried by the time-frequency resources are different for each of two or more sets of adjacent sub-carrier frequencies within the group.

In an LTE-based system, the group of time-frequency resources over which the DMRS is constant may be a single Resource Block, or several Resource Blocks. In some cases, these groups may be aligned with Precoding Resource block Groups (PRGs), as currently defined by the LTE specifications.

The process illustrated in FIG. 4 may be repeated multiple times. In a second transmission time interval, then, the receiving device may again determine that data is transmitted according to the extended transmission mode (the "YES" path from block 420). The device again estimates a propagation channel response using DMRS received within each group of time-frequency resources, again based on an assumption that precoding of DMRS within the group is constant (block 440). The receiving device once more demodulates (block 450) data received within each group, wherein the demodulating is again based on a pattern of data precoding vectors for the group that vary according to different frequencies within the group. This time, however, the multiple data precoding vectors applied to the different frequencies of each group during the second transmission time interval may differ from the data precoding vectors applied to the same frequencies in the first transmission time interval, in some embodiments. This may be for one or several reasons. First, the DMRS precoder applied to a given group of time-frequency resources may be different from the DMRS precoder applied to the same group of time-frequency resources in the prior transmission time interval. This difference is likely to be unknown to the receiving device, such as a UE or wireless device. Second, the pattern of varying precoders for the data elements in the group of time-frequency resources may differ from the pattern applied in the earlier transmission time interval. This difference is known to the UE, either through a pre-programmed relationship or through received signaling that indicates a time-varying pattern of precoder variation.

The process illustrated in FIG. 4 may be implemented in a receiving node/device in a wireless communication system, such as in an LTE UE. This receiving node includes, for example, a receiver circuit adapted to receive data and demodulation reference symbols transmitted by a second node over multiple transmit antennas in each of a plurality of groups of time-frequency resources during a plurality of transmission time intervals. The receiving node further includes a transmitting circuit adapted to transmit channel state information to the second node, e.g., for use by the second node in determining whether the extended transmission mode described above should be employed. Finally, the receiving node includes a a control circuit adapted to determine that data received in a first transmission time interval is transmitted according to an extended transmission mode in which data within each of a plurality of groups of time-frequency resources is precoded for multi-antenna transmission according to different frequencies within the group. The control circuit is further adapted to, for each group of time-frequency resources during the first transmission time interval, estimate a propagation channel response using demodulation reference symbols (DMRS) received within the group, based on an assumption that precoding of DMRS within the group is constant. Further, the control circuit is adapted to, for each group of time-frequency resources during the first transmission time interval, demodulating data received within the group, wherein the demodulating is based on a pattern of data precoding vectors for the group that vary according to different frequencies within the group. Any of the variations of this technique described above may be implemented in the receiving node.

Figure 5:
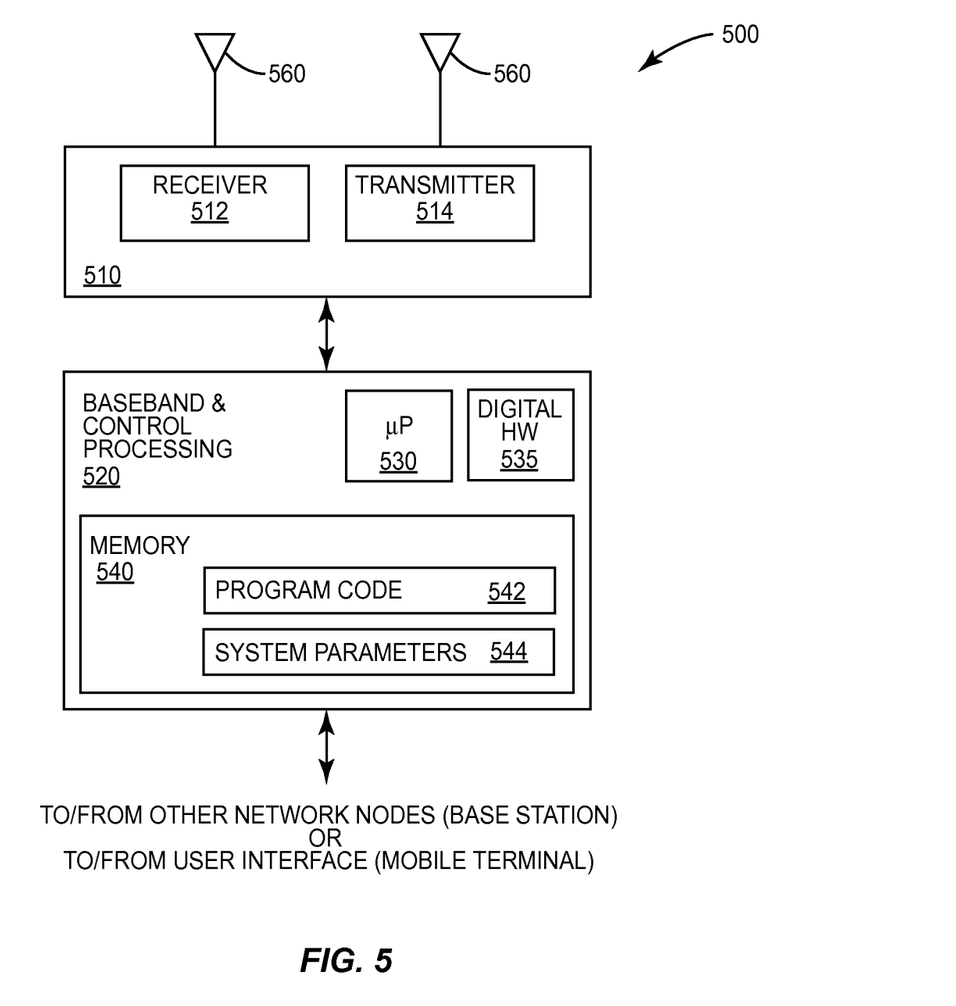
FIG. 5 is a block diagram illustrating functional components of a wireless node according to several embodiments of the invention.

FIG. 5 illustrates one example of a transmitting and/or receiving node 500 configured in accordance with some embodiments of the present invention. It will be appreciated that the illustrated components can be adapted to carry out either the transmitting aspects of the extended transmission node or the receiving aspects of the extended transmission mode, or both. Thus, FIG. 5 illustrates functional elements applicable to a base station, such as an LTE eNodeB, or a mobile terminal, such as an LTE UE. Of course, it will be appreciated that the detailed design of the components illustrated in FIG. 5 will vary a great deal, depending on whether they are developed for use in a base station or a mobile terminal. However, the essential operation of these components as pertains to the present invention is identical for either application.

The pictured apparatus includes radio circuitry 510 and baseband & control processing circuit 520. Radio circuitry 510 includes receiver circuits 512 and transmitting circuits 514, each of which use known radio processing and signal processing components and techniques, typically according to one or more particular telecommunications standards such as the 3GPP specifications for LTE. Receiver circuits 512 and transmitting circuits 514 are each connected to two or more antennas 560. Because the various details and engineering trade-offs associated with the design and implementation of such circuitry are well known and are unnecessary to a full understanding of the invention, additional details are not shown here.

Baseband & control processing circuit 520, which corresponds to the control circuit discussed earlier, includes one or more microprocessors or microcontrollers 530, as well as other digital hardware 535, which may include digital signal processors (DSPs), special-purpose digital logic, and the like. Either or both of microprocessor(s) 530 and digital hardware 535 may be configured to execute program code 542 stored in memory 540, along with system parameters 544. Again, because the various details and engineering tradeoffs associated with the design of baseband/control processing circuitry for wireless base stations and other network nodes are well known and are unnecessary to a full understanding of the invention, additional details are not shown here.

In the event that transmitting/receiving node 500 is a base station or other fixed network node, the node further includes a network interface circuit (not shown), which is configured for communication with other nodes in the wireless network. In an LTE eNodeB, this network interface circuit is configured to communicate with other eNodeBs using the X2 interface and to communicate with the rest of the network using the S1-MME, S11, and S1-U interfaces, for example, where each of these interfaces is defined by 3GPP specifications. In the case of a UE or other mobile terminal, the node will typically also include a user interface (not shown), which allows a user to control the device and to interact with one or more applications that use data transmitted to and from the device.

The program code 542 stored in memory circuit 540, which may comprise one or several types of memory such as read-only memory (ROM), random-access memory, cache memory, flash memory devices, optical storage devices, etc., includes program instructions for executing one or more telecommunications and/or data communications protocols, as well as instructions for carrying out one or more of the techniques described herein. System parameters 544 include various pre-determined configuration parameters, such as one or more predefined thresholds for use in evaluating CSI or one or more pre-configured patterns of precoder vectors, as well as parameters determined from system measurements and the like.

Accordingly, in various embodiments, processing circuits or control circuits, such as the baseband & control processing circuits 520 of FIG. 5, are configured to carry out one or more of the techniques described above for transmitting data to one or more remote nodes, such as to one or more LTE UEs, or for receiving such data, or both. In some cases, these processing circuits are configured with appropriate program code, stored in one or more suitable memory devices, to implement one or more of the techniques described herein. Of course, it will be appreciated that not all of the steps of these techniques are necessarily performed by a single microprocessor or even in a single module. Furthermore, while it will be appreciated that FIG. 5 corresponds to some implementations of a wireless base station, some embodiments of the invention may have different physical implementations, including implementations in which all or part of the functionality of the baseband & control processing circuit 520 is separate from the rest of the apparatus. However, implementations according to these other embodiments will nevertheless include similar processing circuitry and network interface circuitry.

Embodiments of the invention described above address a problem with outdated precoder information that can arise when lean carriers are used, where fall-back open-loop transmission modes with common pilots are not available in every subframe. However, the presently disclosed techniques are not limited in their application to be used only on a lean carrier with LTE's TRM 9. For example, these techniques can also be used for TRM7, TRM8, or TRM 9 as defined in LTE release 10, where the CRS is present. By using the techniques described above for these transmission modes there is no need for RRC signaling and hence much faster adaption to the current CSI state is obtained. These techniques may be applied to systems other than LTE, as well.

Accordingly, it will be appreciated that the foregoing description and the accompanying drawings represent non-limiting examples of the methods and apparatus taught herein. As such, the invention is not limited to the specific embodiments provided in the foregoing description and accompanying drawings, but is instead limited only by the following claims and their legal equivalents.

What is claimed is:

1. A method, in a first node of a wireless communication system, for transmitting data to a second node, the method comprising, for a first transmission time interval:
    determining that first channel state information (CSI) corresponding to the second node is likely to be unreliable for the first transmission time interval;
    precoding demodulation reference symbols (DMRS) for each of a plurality of groups of time-frequency resources, using one or more DMRS precoding vectors, so that the precoding applied to all DMRS within each group of time-frequency resources is constant within the first transmission time interval;
    responsive to said determining, precoding data for each of the groups of time-frequency resources using multiple data precoding vectors for each group so that the precoding within the first transmission time interval varies according to different frequencies within the group; and
    transmitting the precoded DMRS and the precoded data to the second node in each of the time-frequency resources, over multiple transmit antennas.

2. The method of claim 1, further comprising first obtaining the first channel state information by receiving the first channel state information from the second node.

3. The method of claim 1, further comprising first obtaining the first channel state information by estimating the first channel state information based on uplink transmissions from the second node.

4. The method of claim 1, wherein determining that the first channel state information is likely to be unreliable for the first transmission time interval comprises evaluating the first channel state information and determining that a variability in channel conditions over time exceeds a threshold.

5. The method of claim 4, wherein the first CSI comprises a recommended precoder and wherein determining that a variability in channel conditions over time exceeds a threshold comprises counting a number of changes in recommended precoder over a time interval and comparing to the threshold.

6. The method of claim 1, wherein determining that the first channel state information is likely to be unreliable for the first transmission time interval comprises evaluating an age of the first channel state information relative to the first transmission time interval and determining that the age exceeds a threshold.

7. The method of claim 1, wherein each group of time-frequency resources comprises a plurality of sub-carrier frequencies, wherein the data precoding vectors applied to data carried by the time-frequency resources are different for each sub-carrier frequency of the group.

8. The method of claim 1, wherein each group of time-frequency resources comprises a plurality of sub-carrier frequencies, wherein the data precoding vectors applied to data carried by the time-frequency resources are different for each of a plurality of sets of adjacent sub-carrier frequencies within the group.

9. The method of claim 1, wherein each group of time-frequency resources is a Precoding Resource block Group in a Long-Term Evolution (LTE) downlink transmission.

10. The method of claim 1, further comprising first encoding a data block for the second node using a turbo code and interleaving the resulting encoding bits across the plurality of groups of time-frequency resources for the first transmission time interval.

11. The method of claim 1, further comprising, for a second transmission time interval:
determining that second channel state information corresponding to the second node is likely to be unreliable for the second transmission time interval; and,
precoding DMRS for each of a plurality of groups of time-frequency resources, using one or more DMRS precoding vectors, so that the precoding applied to all DMRS within each group of time-frequency resources is constant within the second transmission time interval; and,
responsive to said determining that the second channel state information is likely to be unreliable, precoding data for each of the groups of time-frequency resources using multiple data precoding vectors for each group so that the precoding within the second transmission time interval varies according to different frequencies within the group; and
transmitting the precoded DMRS and the precoded data to the second node in each of the time-frequency resources, over multiple transmit antennas;
wherein the multiple data precoding vectors applied to the different frequencies of each group during the second transmission time interval differ from the data precoding vectors applied to the same frequencies in the first transmission time interval.

12. The method of claim 1, further comprising, for a third transmission time interval:
determining that third channel state information corresponding to the second node is likely to be reliable for the third transmission time interval; and,
precoding DMRS and precoding data, for each of a plurality of groups of time-frequency resources during the third transmission time interval, using precoding vectors that are based on the received channel state information and that do not vary within each group; and
transmitting the precoded DMRS and data to the second node, over multiple transmit antennas, in each of the groups of time-frequency resources during the third transmission time interval.

13. The method of claim 1, further comprising first signaling the second node to indicate the use of varying data precoding vectors.

14. The method of claim 1, wherein the data precoding vectors for each group of time-frequency resources are derived from the DMRS precoding vector for the group and from a predefined pattern of precoder variations for the group.

15. The method of claim 14, wherein the predefined pattern of precoder variations for the group is pre-programmed in the first and second nodes.

16. A method, in a second node of a wireless communication system, for receiving data from a first node, the method comprising:
determining that data received in a first transmission time interval is transmitted according to an extended transmission mode in which data within each of a plurality of groups of time-frequency resources is precoded for multi-antenna transmission such that the precoding varies according to different frequencies within the group;
for each group of time-frequency resources during the first transmission time interval, estimating a propagation channel response using demodulation reference symbols (DMRS) received within the group, based on an assumption that precoding of DMRS within the group is constant; and,
responsive to said determining, for each group of time-frequency resources during the first transmission time interval, demodulating data received within the group, wherein said demodulating is based on a pattern of data precoding vectors for the group that vary according to different frequencies within the group.

17. The method of claim 16, wherein determining that data received in the first transmission time interval is transmitted according to the extended transmission mode comprises receiving transmission configuration information from the first node.

18. The method of claim 16, wherein each group of time-frequency resources comprises a plurality of sub-carrier frequencies, wherein the data precoding vectors applied to data carried by the time-frequency resources are different for each sub-carrier frequency of the group.

19. The method of claim 16, wherein each group of time-frequency resources comprises a plurality of sub-carrier frequencies, wherein the data precoding vectors applied to data carried by the time-frequency resources are different for each of a plurality of sets of adjacent sub-carrier frequencies within the group.

20. The method of claim 16, further comprising:
determining that data received in a second transmission time interval is transmitted according to the extended transmission mode;
for each group of time-frequency resources during the second transmission time interval, estimating a propagation channel response using DMRS received within the group, based on an assumption that precoding of DMRS within the group is constant; and,
for each group of time-frequency resources during the second transmission time interval, demodulating data received within the group, wherein said demodulating is based on a pattern of data precoding vectors for the group that vary according to different frequencies within the group;

wherein the multiple data precoding vectors applied to the different frequencies of each group during the second transmission time interval differ from the data precoding vectors applied to the same frequencies in the first transmission time interval.

21. The method of claim 16, wherein the data precoding vectors for each group of time-frequency resources are derived from the DMRS precoding vector for the group and from a predefined pattern of precoder variations for the group.

22. The method of claim 21, wherein the predefined pattern of precoder variations for the group is pre-programmed in the first and second nodes.

23. A transmitting node in a wireless communication system, the transmitting node comprising
a transmitting circuit adapted to transmit data and demodulation reference symbols to a second node over multiple transmit antennas in each of a plurality of groups of time-frequency resources during each of a plurality of transmission time intervals, and
a control circuit adapted to, for a first transmission time interval:
determine that first channel state information (CSI) corresponding to the second node is likely to be unreliable for the first transmission time interval;
control the transmitting circuit to, for each of a plurality of groups of time-frequency groups of time-frequency resources during the first transmission time interval, transmit demodulation reference symbols (DMRS) to the second node over multiple transmit antennas, using a DMRS precoding vector, so that the precoding applied to all DMRS within each group of time-frequency resources is constant; and,
responsive to said determining, control the transmitting circuit to, for each group of time-frequency resources during the first transmission time interval, transmit data to the second node over the multiple transmit antennas, using multiple data precoding vectors that vary according to different frequencies within the group.

24. The transmitting node of claim 23, wherein the control circuit is adapted to determine that the first channel state information is likely to be unreliable for the first transmission time interval by evaluating the first channel state information and determining that a variability in channel conditions over time exceeds a threshold.

25. The transmitting node of claim 24, wherein the first CSI comprises a recommended precoder and wherein determining that a variability in channel conditions over time exceeds a threshold comprises counting a number of changes in recommended precoder over a time interval and comparing to the threshold.

26. The transmitting node of claim 23, wherein each group of time-frequency resources comprises a plurality of sub-carrier frequencies, and wherein the data precoding vectors applied to data carried by the time-frequency resources are different for each sub-carrier frequency of the group.

27. The transmitting node of claim 23, wherein each group of time-frequency resources comprises a plurality of sub-carrier frequencies, wherein the data precoding vectors applied to data carried by the time-frequency resources are different for each of a plurality of sets of adjacent sub-carrier frequencies within the group.

28. The transmitting node of claim 23, wherein the control circuit is further adapted to first encode a data block for the second node using a turbo code and interleave the resulting encoding bits across the plurality of groups of time-frequency resources for the first transmission time interval.

29. The transmitting node of claim 23, wherein the control circuit is further adapted to, for a second transmission time interval:
determine that second channel state information corresponding to the second node is likely to be unreliable for the second transmission time interval and
precode DMRS for each of a plurality of groups of time-frequency resources, using one or more DMRS precoding vectors, so that the precoding applied to all DMRS within each group of time-frequency resources is constant within the second transmission time interval; and,
responsive to said determination that the second channel state information is likely to be unreliable, precode data for each of the groups of time-frequency resources using multiple data precoding vectors for each group so that the precoding within the second transmission time interval varies according to different frequencies within the group; and
transmit the precoded DMRS and the precoded data to the second node in each of the time-frequency resources, over multiple transmit antennas;
wherein the multiple data precoding vectors applied to the different frequencies of each group during the second transmission time interval differ from the data precoding vectors applied to the same frequencies in the first transmission time interval.

30. The transmitting node of claim 23, wherein the control circuit is further adapted to, for a third transmission time interval:
determine that third channel state information corresponding to the second node is likely to be reliable for the third transmission time interval; and,
precode DMRS and data, for each of a plurality of groups of time-frequency resources during the third transmission time interval, using precoding vectors that are based on the received channel state information and that do not vary within each group; and
transmit the precoded DMRS and data to the second node, over multiple transmit antennas, in each of the groups of time-frequency resources during the third transmission time interval.

31. The transmitting node of claim 23, wherein the control circuit is further configured to first signal the second node to indicate the use of varying data precoding vectors.

32. The transmitting node of claim 23, wherein the data precoding vectors for each group of time-frequency resources are derived from the DMRS precoding vector for the group and from a predefined pattern of precoder variations for the group.

33. The transmitting node of claim 32, wherein the predefined pattern of precoder variations for the group is pre-programmed in the transmitting node and in the second node.

34. A receiving node in a wireless communication system, the receiving node comprising
a receiver circuit adapted to receive data and demodulation reference symbols transmitted by a first node over multiple transmit antennas in each of a plurality of groups of time-frequency resources during a plurality of transmission time intervals,
a transmitting circuit adapted to transmit channel state information to the first node, and a control circuit adapted to determine that data received in a first transmission time interval is transmitted according to an extended transmission mode in which data within each of a plurality of groups of time-frequency resources is precoded for multi-antenna transmission such that the precoding varies according to different frequencies within the group, and, responsive to said determining, to control the receiver circuit to:

for each group of time-frequency resources during the first transmission time interval, estimate a propagation channel response using demodulation reference symbols (DMRS) received within the group, based on an assumption that precoding of DMRS within the group is constant; and,     for each group of time-frequency resources during the first transmission time interval, demodulate data received within the group, wherein said demodulating is based on a pattern of data precoding vectors for the group that vary according to different frequencies within the group.

35. The receiving node of claim 34, wherein the control circuit is adapted to determine that data received in the first transmission time interval is transmitted according to the extended transmission mode by receiving transmission configuration information from the first node.

36. The receiving node of claim 34, wherein each group of time-frequency resources comprises a plurality of sub-carrier frequencies, wherein the data precoding vectors applied to data carried by the time-frequency resources are different for each sub-carrier frequency of the group.

37. The receiving node of claim 34, wherein each group of time-frequency resources comprises a plurality of sub-carrier frequencies, wherein the data precoding vectors applied to data carried by the time-frequency resources are different for each of a plurality of sets of adjacent sub-carrier frequencies within the group.

38. The receiving node of claim 34, wherein the control circuit is adapted to derive the data precoding vectors for each group of time-frequency resources from the DMRS precoding vector for the group and from a predefined pattern of precoder variations for the group.

39. The receiving node of claim 38, wherein the predefined pattern of precoder variations for the group is pre-programmed in the first node and in the receiving node.

\* \* \* \* \*